United States Patent [19]

Fesman

[11] Patent Number: 4,458,036
[45] Date of Patent: Jul. 3, 1984

[54] FLEXIBLE POLYURETHANE FOAMS CONTAINING GLYCOLURIL REACTION PRODUCTS FOR A FLAME AND EMBER DRIP RETARDANCE

[75] Inventor: Gerald Fesman, Teaneck, N.J.

[73] Assignee: Stauffer Chemical Company, Westport, Conn.

[21] Appl. No.: 470,121

[22] Filed: Feb. 28, 1983

[51] Int. Cl.³ .............................................. C08G 18/14
[52] U.S. Cl. .................................. 521/107; 252/609; 521/114; 521/116; 521/117; 521/128; 521/131; 521/132; 521/171; 524/104; 524/127; 524/341; 524/371; 524/375; 524/380; 524/597
[58] Field of Search ............... 521/107, 114, 116, 117, 521/128, 131, 132, 171; 252/609; 524/127, 104, 341, 371, 375, 380, 597

[56] References Cited

U.S. PATENT DOCUMENTS

| | | | |
|---|---|---|---|
| 3,041,293 | 6/1962 | Polacek | 521/107 |
| 3,134,742 | 5/1964 | Wismer et al. | 521/107 |
| 3,135,707 | 6/1964 | Nyquist et al. | 521/164 |
| 4,118,437 | 10/1978 | Parekh | 525/162 |
| 4,122,049 | 10/1978 | Wagner | 521/136 |
| 4,130,697 | 12/1978 | Stern et al. | 521/106 |
| 4,139,501 | 2/1979 | Rudner et al. | 521/136 |
| 4,160,075 | 7/1979 | Golser | 521/158 |

*Primary Examiner*—Maurice J. Welsh
*Attorney, Agent, or Firm*—Roger S. Benjamin

[57] ABSTRACT

Polyurethane foams prepared from the reaction of polyester polyol with organic isocyanate have improved flame retardance and dripping ember retardance by incorporation of an additive comprising (1) halogenated flame retardant, and (2) organic solvent soluble glycoluril-formaldehyde material.

19 Claims, No Drawings

FLEXIBLE POLYURETHANE FOAMS CONTAINING GLYCOLURIL REACTION PRODUCTS FOR A FLAME AND EMBER DRIP RETARDANCE

BACKGROUND OF THE INVENTION

Flexible polyurethane foams prepared from organic isocyanates and polyester polyols have general utility as resilient materials for furniture, cushions, mattresses, and upholstery. Polyurethane foams typically burn with ease and often emit dripping embers which tend to spread combustion.

It is known to improve the flammability of flexible foams by the use of halogenated organophosphorus flame retardants, such as those described in U.S. Pat. No. 3,041,293.

The use of specific amino resins and amino resin derivatives for inclusion in polyurethane foams has been described in the prior art. For example, U.S. Pat. No. 3,134,742 employs a synergistic combination of flame retardant ingredients wherein one ingredient is the reaction product of an acidic phosphorus compound and an amino compound. U.S. Pat. No. 3,135,707 describes polyurethane foams derived from partially alkylated polymethylolmelamines. U.S. Pat. No. 4,122,049 describes a polyurethane forming process using sedimenting dispersions of aminoplasts. U.S. Pat. No. 4,130,697 describes polyurethane foam systems wherein aminoplast precondensates are reacted with organic isocyanates. U.S. Pat. No. 4,139,501 describes melamine derivative amino resins incorporated into flexible polyurethane foams with optional halogenated organophosphorus compounds. U.S. Pat. No. 4,160,075 describes foams prepared from a reaction product of aminoplast precondensates and organic isocyanates.

Polyurethane foams containing halogenated organophosphorus compounds and urea-formaldehyde resin are described in applicant's copending application. Ser. No. 449,719, filed Dec. 14, 1982 now U.S. Pat. No. 4,433,071. A disadvantage of these urea-formaldehyde containing compositions is that they often emit a formaldehyde odor during cure.

It is desirable to develop new polyurethane foam additives which effectively enhance flame retardant and dripping ember retardant properties without excessive release of toxic fumes during foam formation.

FIELD OF THE INVENTION

This invention is an improvement in flame retardant polyurethane foams and methods of making such foams.

SUMMARY OF THE INVENTION

This invention is an improved flame retardant and dripping ember retardant polyurethane foam and a method of making foam. The foam and method of the invention are practiced by including in the foam formulation an effective amount of an additive comprising (1) halogenated flame retardant, and (2) organic solvent soluble glycoluril-formaldehyde resin.

Moreover, this invention is a composition of matter suitable for imparting flame retardance and dripping ember retardance to urethane foams. This composition contains as essential ingredients a mixture of (1) halogenated flame retardant, and (2) organic solvent soluble glycoluril-formaldehyde resin.

DETAILED DESCRIPTION OF THE INVENTION

The object of this invention is accomplished by incorporating into a polyester polyol derived flexible foam a synergistic additive combination of flame retardant and dripping ember retardant additives.

METHOD OF MAKING POLYURETHANE FOAM

The process of the invention is practiced by conventional polyurethane flexible foam forming technology. Polurethane foams according to this invention having a density of 18 to 64 kg. per cubic meter are prepared by known methods such as the prepolymer, quasi-polymer, or one-shot systems. Foams may be prepared by batch or continuous processes. The foam forming mixture should include as basic ingredients: (A) polyester polyol, (B) organic isocyanate, (C) blowing agent, (D) polyurethane catalyst, (E) surfactant, and (F) a combination of halogenated flame retardant additive, and organic solvent soluble glycoluril-formaldehyde resin additive.

The polyester polyol ingredient (A) for the polyurethane foam formulation of this invention may be selected from one or a mixture of polyols conventionally used for the preparation of flexible polyurethane foams. Polyester polyols suitable for the preparation of flexible polyurethane foams typically have a molecular weight between 500 and 5000 and hydroxyl numbers of from about 15 to about 300. Suitable polyols include the linear polymeric polyesters prepared from glycols and saturated polycarboxylic acids. For example, difunctional polyester polyols can be prepared by the reaction of diethylene glycol with adipic acid.

The organic polyisocyanate ingredient (B) of the foam forming process may be selected from conventional isocyanates used for such purposes. Preferably the isocyanate has an isocyanate functionality of from 2 to 3. Useful isocyanate include aromatic, aliphatic, cycloaliphatic, heterocyclic types and mixtures thereof. Suitable organic isocyanates include toluene diisocyanates, and phenylene diisocyanates, with toluene diisocyanate being preferred because of cost and availability.

The blowing agent (C) ingredient may comprise water alone or water in combination with other conventional blowing agents, such as methylene chloride, or hydrocarbons or fluorocarbons having a boiling point from about $-30°$ C. to $60°$ C.

The polyurethane catalyst ingredient (D) is selected from materials conventional for such purpose. Suitable catalysts include amines such as tertiary amines and metal compounds such as stannous octoate, dibutyltin dilaurate, etc.

The surfactant ingredient (E) employed in the process of the invention may be selected from surfactants conventionally used for such purposes.

The halogenated flame retardant/dripping ember retardant additive (F) of the invention contains as essential ingredients a combination of halogenated flame retardant, and solvent soluble glycoluril-formaldehyde resin.

The halogenated flame retardant ingredient used in the process and foam of the invention may be selected from conventional polyurethane flame retardant agents. The term, "halogenated flame retardant" as used in the context of this invention includes halogenated hydrocarbons and halogenated organophosphorus compounds.

Examples of suitable halogenated flame retardants are tris(1,3-dichloropropyl)phosphate, tris(2,3-dibromopropyl)phosphate, dichloromethylene-bis(di-2-chloroethyl)phosphate, tris(2-chloroethyl)phosphate, tris(2-chloropropyl)phosphate, 2,2-bis(chloromethyl)1,3-propylene bis-di(2-chloroethyl)phosphate, bis(dichloropropyl)tribromoneopentyl phosphate, tetrakis(2-chloroethyl)ethylene diphosphate, oligomeric phosphate ester as described in Canadian Pat. No. 1,127,176, pentabromodiphenyl oxide, bis(pentabromophenoxy)ethane, bis(tetrabromophthalimide)ethane, tetrabromobisphenol A, hexabromocyclododecane, bis(tribromophenoxy)ethane, octabromodiphenyl oxide, tribromoneopentyl alcohol, chlorinated paraffin, brominated paraffin, and mixtures thereof.

The glycoluril-formaldehyde material may be formed by the reaction of urea and glyoxal to form glycoluril, then reaction of the glycoluril with formaldehyde to form tetramethylol glycoluril followed by reaction with alcohol and acid to yield tetrakismethoxymethylglycoluril. Suitable reaction conditions are described in U.S. Pat. No. 4,118,437, columns 4 and 5, the disclosure of which is incorporated herein by reference.

The halogenated flame retardant and the glycoluril-formaldehyde resin additives are both non-reactive in the polyurethane formulation and their presence does not significantly affect the stoichiometry of the foam forming reaction. The amount of flame retardant and dripping ember retardant additive used in the foam is an amount effective to give the combined reduction of flame retardant and dripping ember properties desired by the user. A useful standard for determining suitable levels of additive is the Underwriters' Laboratories UL-94 test. Urethane foam samples passing the HF-1 standard of the UL-94 test are considered to contain effective levels of additive for the purpose of the invention.

The combined weight of (1) halogenated flame retardant and (2) organic solvent soluble glycoluril-formaldehyde resin is typically from about 8 to about 20 weight percent of the total weight of the foam formulation ingredients or of the final flexible polyurethane foam product. The ratio of (1) halogenated flame retardant to (2) organic solvent soluble glycoluril-formaldehyde resin is from about 4:1 to about 1:1 with a ratio range of from 3:1 to 2:1 being preferred.

COMPOSITION FOR FLAME AND DRIPPING EMBER RETARDANCE OF FOAMS

A further important aspect of this invention is a premixed storage stable composition of matter suitable for addition to a foam forming reaction system which imparts enhanced flame retardance and dripping ember retardance to a flexible polyurethane foam product. This composition is a mixture containing as essential ingredients: (1) halogenated flame retardant, and (2) organic solvent soluble glycouril-formaldehyde resin. Since the composition is intended for eventual inclusion into a polyurethane foam formulation it may include a variety of optional ingredients suitable for such use. For example, if desired, the composition may be combined with one (not both) of the polyol or isocyanate foam reactants. Other optional ingredients may be selected from solvents, diluents, colorants, stabilizers, cell openers, lubricants, biocides, etc. A preferred practice of the invention is to have the flame and dripping ember retardant composition consist solely or substantially (at least 85 weight percent) of its essential ingredients. The composition is preferably in the form of a liquid having the glycoluril-formaldehyde resin dissolved and/or suspended in the halogenated flame retardant.

The halogenated flame retardant ingredient of the composition may be selected from the list of suitable halogenated organophosphorus compounds in the preceding "Method of Making Polyurethane Foam" section of this specification. It is particularly advantageous to use at least one halogenated flame retardant which is capable of dissolving the resin or holding it as a non-settling suspension. Tris(dichloropropyl)phosphate is a preferred halogenated flame retardant.

The glycoluril-formaldehyde resin ingredient suitable for use in the composition is a non-isocyanate reactive liquid material as set out in the preceding "Method of Making Polyurethane Foam" section of the specification.

The composition is used by mixing it in any order with the polyurethane foam forming ingredients either prior to or at the time of reaction.

The following Example is provided for the purpose of illustration and is not intended to limit the disclosed invention.

EXAMPLE

This example describes the batch preparation of flexible polyurethane foam by the one-shot method. The ingredients used for the foam formulation are as follows:

|  | Parts by Weight |
| --- | --- |
| Basic Ingredients | |
| Fomrez 53 ® brand polyester polyol resin, derived from diethylene glycol and adipic acid plus crosslinking agent | 100 |
| Witco 1058 ™ brand surfactant, diethyl ammonium oleate | 1.3 |
| Witco M6682A ™ brand surfactant, acid no. 2.88; pH 4.9 10% water, an ethoxylated fatty acid derivative | 1.4 |
| N—ethylmorpholine | 1.9 |
| ARMEEN DM16D ™ brand gelation catalyst, dimethylhexadecylamine | 0.3 |
| 80/20 Toluene diisocyanate | 44 |
| Water | 3.6 |
| Additives | |
| Glycoluril-formaldehyde resin (modified methyl or fully butylated type) CYMEL ® 1170 resin, product of American Cyanamid Co. | 5 |
| Fyrol ® FR-2 flame retardant, product of Stauffer Chemical Co., tri(1,3-dichloropropyl)phosphate | 15 |

Three different sample foams designed A, B, and C were prepared.

Foam A was prepared from the above list of basic ingredients absent both the Fyrol ®FR-2 flame retardant and the glycoluril-formaldehyde resin additive.

Foam B was prepared from the above list of basic ingredients plus the Fyrol ®FR-2 flame retardant additive.

Foam C was prepared using the basic ingredients plus both the Fyrol ®FR-2 flame retardant additive and the glycoluril-formaldehyde resin additive.

Each of the foams was prepared by the same method. The toluene diisocyanate ingredient was added to a mixture of the balance of the formulation ingredients. The prepared foams were tested for flammability using the UL 94 Method (Underwriters' Laboratories, Inc. UL 94 "Test for Flammability of Plastic Materials for Parts in Devices and Appliances", Feb. 1, 1974). Test results and composition of the sample foams are set out below.

|  | Foam with no additive | Foam with Fyrol FR-2 alone (15 php) | Foam with Fyrol FR-2 (15 php) and CYMEL ® 1170 (5 php) |
|---|---|---|---|
| UL 94 Burn Distance Inches (Total) | 5.0 | 1.4 | 1.2 |
| UL 94 Burn Time Secs | 60 | 5 | 0 |
| Flaming, dripping embers | Yes | Yes | None |
| Cotton ignition from embers | Yes | Yes | No |
| UL Rating |  |  | UL 94 HF-1 |

(php is parts per hundred parts polyol)

Summary:

Foams A and B prepared absent one or both of the essential ingredients exhibited an inferior combination of burn distance, burn time, dripping ember, and cotton ignition properties compared with Foam C prepared using a combination of ingredients according to the practice of the invention. Only the Foam C prepared with Fyrol ®FR-2 and CYMEL ®1170 resin passed the 94 HF-1 burning-test classification.

Based on this disclosure other modifications are suggested to those skilled in the art. These modifications are intended to be comprehended within the claimed scope of the invention.

I claim:

1. In a process for preparing flexible polyurethane foam by the reaction of a polyester polyol and an organic polyisocyanate wherein the improvement comprises:

adding to the polyurethane forming reactants a blowing agent comprising water, polyurethane forming catalyst, surfactant, and a flame and dripping ember retardant effective amount of an additive combination comprising (1) halogenated flame retardant, and (2) organic solvent soluble glycoluril-formaldehyde material.

2. The process of claim 1 wherein the halogenated flame retardant is selected from the group consisting of tris(1,3-dichloropropyl)phosphate, tris(2,3-dibromopropyl)phosphate, dichloromethylene-bis(di-2-chloroethyl)phosphate, tris(2-chloroethyl)phosphate, tris-(2-chloropropyl)phosphate, 2,2-bis(chloromethyl)-1,3 propylene bis(di(2-chloroethyl)phosphate, bis(dichloropropyl)tribromoneopentyl phosphate, tetrakis(2-chloroethyl)ethylene diphosphate, pentabromodiphenyl oxide, bis(pentabromophenoxy)ethane, bis-(tetrabromophthalimide)ethane, tetrabromobisphenol A, hexabromocyclododecane, bis(tribromophenoxy)ethane, octabromodiphenyl oxide, tribromoneopentyl alcohol, chlorinated paraffin, brominated paraffin, and mixtures thereof.

3. The process of claim 1 wherein the combined weight of said halogenated flame retardant and said glycoluril-formaldehyde material is from about 8 to about 20 weight percent of the total weight of reaction mixture, and the weight ratio of said halogenated flame retardant to said glycoluril-formaldehyde material is from about 4:1 to about 1:1.

4. The process of claim 3 wherein the weight ratio of said halogenated flame retardant to said glycoluril-formaldehyde material is from 3:1 to 2:1.

5. The process of claim 1 wherein the surfactant contains an ethoxylated fatty acid derivative.

6. The process of claim 1 wherein the resin is selected from the group consisting of fully butylated glycoluril-formaldehyde material and modified methyl glycoluril-formaldehyde material.

7. A flexible polyurethane foam prepared from polyester polyol and organic isocyanate which contains a flame and dripping ember retardant effective amount of (1) halogenated flame retardant, and (2) organic solvent soluble glycoluril-formaldehyde material.

8. The foam of claim 7 wherein the halogenated flame retardant is selected from the group consisting of tris(1,3-dichloropropyl)phosphate, tris(2,3-dibromopropyl)phosphate, dichloromethylene-bis(di-2-chloroethyl)phosphate, tris(2-chloroethyl)phosphate, tris-(2-chloropropyl)phosphate, 2,2-bis(chloromethyl)1,3-propylene bis-di(2-chloroethyl)phosphate, bis(dichloropropyl)tribromoneopentyl phosphate, tetrakis(2-chloroethyl)ethylene diphosphate, pentabromodiphenyl oxide, bis(pentabromophenoxy)ethane, bis(tetrabromophthalimide)ethane, tetrabromobisphenol A, hexabromocyclododecane, bis(tribromophenoxy)ethane, octabromodiphenyl oxide, tribromoneopentyl alcohol, chlorinated paraffin, brominated paraffin, and mixtures thereof.

9. The foam of claim 7 wherein the combined weight of said halogenated flame retardant and said glycoluril-formaldehyde material is from about 8 to about 20 weight percent of the total weight of foam, and the weight ratio of said halogenated flame retardant to said glycoluril-formaldehyde material is from about 4:1 to about 1:1.

10. The foam of claim 9 wherein the weight ratio of halogenated flame retardant to glycoluril-formaldehyde material is from 3:1 to 2:1.

11. The foam of claim 7 wherein the resin is a methylated glycoluril-formaldehyde material.

12. A composition for enhancing the flame retardance and dripping ember retardance of polyurethane foams which comprises (1) halogenated flame retardant, and (2) organic solvent soluble glycoluril-formaldehyde material.

13. The composition of claim 12 wherein the halogenated flame retardant is selected from the group consisting of tris(2,3-dichloropropyl)phosphate, tris(2,3-dibromopropyl)phosphate, dichloromethylene-bis(di-2-chloroethyl)phosphate, tris(2-chloroethyl)phosphate, tris(2-chloropropyl)phosphate, 2,2-bis(chloromethyl)1,3-propylene bis-di(2-chloroethyl)phosphate, bis(-dichloropropyl)tribromoneopentyl phosphate, tetrakis (2-chloroethyl)ethylene diphosphate, oligomeric phosphate ester as described in Canadian Pat. No. 1,127,176, pentabromodiphenyl oxide, bis(pentabromophenoxy)ethane, bis(tetrabromophthalimide)ethane, tetrabromobisphenol A, hexabromocyclododecane, bis(tribromophenoxy)ethane, octabromodiphenyl oxide, tribromoneopentyl alcohol, chlorinated paraffin, brominated paraffin, and mixtures thereof.

14. The composition of claim 12 wherein the weight ratio of said halogenated flame retardant to said glycoluril-formaldehyde material is from about 4:1 to about 1:1.

15. The composition of claim 14 wherein the weight ratio of said halogenated flame retardant to said glycoluril-formaldehyde material is from 3:1 to 2:1.

16. The composition of claim 12 wherein the resin is selected from the group consisting of fully butylated glycoluril-formaldehyde material and modified methyl glycoluril-formaldehyde material.

17. The composition of claim 12 in liquid form.

18. The composition of claim 17 wherein all or a portion of the resin is non-settleably suspended in a liquid halogenated flame retardant medium.

19. The composition of claim 18 wherein a major portion of said halogenated flame retardant is selected from the group consisting of tris(2-chloroethyl)phosphate, tris(beta-chloropropyl)phosphate, tris(dichloropropyl)phosphate, or mixtures thereof.

* * * * *

UNITED STATES PATENT AND TRADEMARK OFFICE
CERTIFICATE OF CORRECTION

PATENT NO. : 4,458,036
DATED : July 3, 1984
INVENTOR(S) : Gerald Fesman

It is certified that error appears in the above—identified patent and that said Letters Patent is hereby corrected as shown below:

Col. 5, line 56, "bis(di(2-chloroethyl)phosphate" should read -- bis-di(2-chloroethyl)phosphate --.

Signed and Sealed this

Eighth Day of January 1985

[SEAL]

Attest:

*Attesting Officer*

GERALD J. MOSSINGHOFF

*Commissioner of Patents and Trademarks*